United States Patent
Aviram et al.

(10) Patent No.: US 6,197,896 B1
(45) Date of Patent: Mar. 6, 2001

(54) GRAFT POLYMERS AND USE THEREOF

(75) Inventors: Ari Aviram, Croton-on-Hudson; Inna V. Babich, Chappaqua, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/351,421

(22) Filed: Jul. 12, 1999

(51) Int. Cl.[7] ................ C08F 8/42; C08K 5/05; C08L 29/04
(52) U.S. Cl. ............. 525/370; 525/360; 524/379; 524/391; 524/504
(58) Field of Search .................. 524/379, 391, 524/504; 525/360, 370

(56) References Cited

U.S. PATENT DOCUMENTS

| | | | |
|---|---|---|---|
| 3,359,226 | * 12/1967 | Arthur et al. | 524/108 |
| 3,532,708 | * 10/1970 | Blance | 524/300 |
| 4,508,779 | * 4/1985 | Miyake et al. | 428/383 |
| 4,657,978 | * 4/1987 | Wakabayashi et al. | 525/100 |
| 4,921,880 | * 5/1990 | Lee et al. | 522/12 |
| 5,153,068 | * 10/1992 | Kohara et al. | 428/405 |
| 5,743,951 | * 4/1998 | Ozai et al. | 106/287.11 |

\* cited by examiner

*Primary Examiner*—Janet Baxter
*Assistant Examiner*—Sin J. Lee
(74) *Attorney, Agent, or Firm*—Pollock, Vande Sande & Amernick; Daniel P. Morris

(57) ABSTRACT

Solutions of graft polymers of a polymer having reactive hydrogen groups and grafted through reactive hydrogen groups an alkoxy metallic compound wherein the metal is titanium, zirconium and/or hafnium are useful as photoresist materials which are resistant to plasma. Also, compounds and graft polymers wherein the alkoxy metallic compound also contains silicon, tin or germanium are provided.

42 Claims, No Drawings

GRAFT POLYMERS AND USE THEREOF

FIELD OF THE INVENTION

The present invention relates to certain solutions of graft polymers which can be used as photoresists and which exhibit enhanced resistance to plasma and especially to Cl/O plasma used in reactive ion etching. The present invention is concerned with the compositions as well as their use in lithography. For instance, the materials of the present invention are suitable for use in device fabrication on all optical, e-beam, x-ray and ion-beam lithography tools.

The present invention is also concerned with certain graft polymers that exhibit increased hydrophobicity or increased hydrophilicity depending upon the characteristics of the moiety grafted onto the polymer. Moreover, graft polymers of the present invention can be grafted so as to create a permanent graft of a dye thereon.

BACKGROUND OF INVENTION

In the manufacture of patterned devices and especially microelectric devices, the processes of etching different layers which constitute the finished product are among the most crucial steps involved. One method widely employed in the etching process is to overlay the surface to be etched with a suitable mask.

The mask is typically created by imagewise forming a pattern of photoresist material over those areas of the substrate to be shielded from the etching. The photoresist is normally formed of a polymeric organic material. The pattern is formed by imagewise exposing the photoresist material to irradiation by photolithographic techniques. The irradiation employed is usually x-ray, UV radiation, or electron beam radiation.

Photosensitive materials and/or compositions are either positive-acting (i.e. photosolubilizable) or negative-acting (i.e. photoinsolubilizable or photocrosslinkable). Positive-working (photo)sensitive compositions are rendered soluble (or developable) by actinic radiation (deep-near UV, x-ray or electron-beam) and can be removed using selective developing solutions leaving unexposed areas intact. Negative-working (photosensitive compositions are those which become insoluble upon exposure to actinic radiation. Selected solutions can dissolve and remove the unexposed areas of the composition while leaving the exposed portions intact. Development of such exposed materials yields negative tone images.

Concerning positive working resists, it is well known in the art that the photochemical formation of carboxylic acids, be it by amplified means such as a catalytic acidic-decomposition of a tertiary butyl ester, or as in the case of the photochemical decomposition of 1,2-naphthoquinone diazides, can be employed to produce high resolution and high efficiency resists. This type of reaction is being relied upon extensively in the production of positive working resists.

The manufacture of integrated circuits and other patterned devices relies primarily on resist materials that enable the formation of high resolution patterns. In the search for materials and methods for formation of patterns below 0.25 microns, it is recognized that such patterns require exposure sources based on UV radiation below 248 nm, or on x-ray, or on e-beams. Likewise, it is essential to employ resist materials suitable for use with short wavelengths sources. In the case of UV radiation, it might be convenient to use excimer laser sources that produce radiation at 193 nm.

U.S. patent application Ser. No. 08/700,348 discloses certain polymer compositions that when exposed to actinic light such as UV radiation below 240 nm, or soft rays, x-ray or e-beam, undergo a photochemical reaction that leads to the formation of pendant carboxylic acid groups, which are base soluble. This photochemical reaction is very efficient and can be used for high resolution positive resists.

In particular, the resists are non-amplified polymers having pendant recurring groups selected from the group consisting of

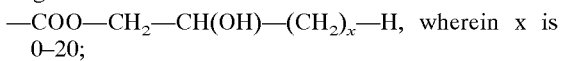

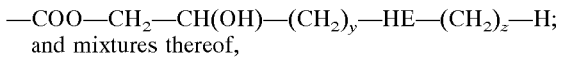
and mixtures thereof, wherein HE is O or S, and each y and z individually is 1–18, and mixtures thereof.

U.S. patent application Ser. No. 08/717,644 discloses using certain copolymers for minimizing possible water absorption of the non-irradiated regions of the resist film. These copolymers are from monomers consisting essentially of:

1) $CH_2CHCOOCH_2CHOH(CH_2)_nH$ and/or $CH_2C(CH_3)$ 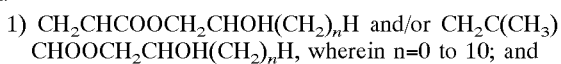, wherein n=0 to 10; and 2) $CH_2CHCOO(CH_2)_nH$ and or 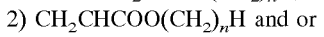

$CH_2C(CH_3)$ $COO(CH_2)_nH$, wherein n=1 to 10. The amount of 1) is about 75 to about 95, preferably about 80 to about 90, and most preferably about 84 to about 87 wt. % and the amount of 2) is about 5 to about 25, preferably about 10 to about 20 and most preferably about 13 to about 16 wt. %. These weight percents are based upon the total weight of 1) and 2)).

The entire disclosures of U.S. patent applications Ser. No. 08/700,348 and 08/717,644 are incorporated herein by reference.

After the photoresist is developed forming the desired mask, the substrate and mask can be immersed in a chemical solution which attacks the substrate to be etched while leaving the mask intact. These wet chemical processes suffer from the difficulty of achieving well-defined edges on the etched surfaces. This is due to the chemicals undercutting the mask and the formation of an isotropic image. In other words, conventional chemical wet processes do not provide the selectivity of direction (anisotropy) considered necessary to achieve optimum dimensional consistent with current processing requirements.

Moreover, such wet etching processes are undesirable because of the environmental and safety concerns associated therewith.

Accordingly, various so-called "dry processes" have been suggested to improve the process from an environmental viewpoint, as well as to reduce the relative cost of the etching. Furthermore, these "dry processes" have the potential advantage of greater process control and higher aspect ratio images. Also, when fabricating patterns having feature sizes below 350 nm, dry etching processes are necessary.

Such "dry processes" generally involve passing a gas through a container and creating a plasma in this gas. The species in this gas are then used to etch a substrate placed in the chamber or container. Typical examples of such "dry processes" are plasma etching, sputter etching, and reactive ion etching.

Reactive ion etching provides well-defined, vertically etched sidewalls.

However, a crucial challenge posed by the reactive ion etching relates to providing photoresist compositions that are sensitive to the radiation employed in its imaging procedure but resistant to the reactive ion etching. A particularly harsh environment for the resist material involves those RIE processes using Cl/O plasma. Most resist materials do not survive long enough in this environment to provide proper protection. The manufacture of optical masks requires a chromium etch step which can be done preferentially by RIE etching. This step requires Cl/O plasma.

However, although the above discussed non-chemically amplified resists based upon the polymers disclosed in U.S. Ser. No. 08/700,348 and 08/717,644 perform quite well lithographically, their resistance to withstand plasma environments and especially Cl/O plasma is not satisfactory.

It has also been found that the available commercial e-beam resists offer little protection in this plasma environment.

In co-pending application U.S. Ser. No. (YO998-421) titanates, zirconium and/or hafnium are added to polymers having hydroxy groups to import improved resistance to reactive ion etching. The addition of these compounds also enhances the development with TMAH, an industry standard, which improves film Tg and hardness.

Furthermore, organic tetra alkyl titanates and titanate chelates such as the series of DuPont products available under the tradename TYZOR® promote crosslinking of polymers that contain active hydrogen groups such as hydroxy, amino, amido, carboxyl and thio groups. The reaction produces resins with improved hardness, solvent resistance and new electrical properties.

The mechanism of the crosslinking reaction proceeds through an equilibrium between the alkoxy of the titanate and, as an example, the hydroxyl group of the polymer.

Ti(OR)$_4$+POH - - - POTi(OR)$_3$+ROH

Another group of resists is referred to as "Amplified Resists" contain a phenolic group, but wherein are also not RIE resistant.

SUMMARY OF THE INVENTION

The present invention provides solutions of graft polymers which, among other uses, can be used in lithography. The polymers exhibit enhanced resistance to plasma and especially to Cl/O plasma used in reactive ion etching.

In particular, the present invention relates to solutions in an alcohol of a graft polymer having reactive hydrogen groups and grafted through reactive hydrogen groups an alkoxy metallic compound wherein metal is titanium, zirconium and/or hafnium.

The present invention also relates to a method for forming a pattern of a photoresist which comprises:
  a) applying to a substrate a solution in an alcohol of a graft polymer having reactive hydrogen groups and grafted through reactive hydrogen groups an alkoxy metallic compound wherein the metal is titanium, zirconium and/or hafnium;
  b) removing the alcohol;
  c) imagewise exposing the graft polymer to irradiation; and
  d) developing the photoresist to thereby form the pattern.

A still further aspect of the present invention relates to a method for forming a pattern on a substrate which comprises:
  a) providing a layer to be patterned on a substrate;
  b) applying on the layer to be patterned a solution in an alcohol of a graft polymer having reactive hydrogen groups and grafted through reactive hydrogen groups an alkoxy metallic compound wherein the metal is titanium, zirconium and/or hafnium;
  c) removing the alcohol;
  d) imagewise exposing the graft polymer to irradiation;
  e) developing the graft polymer to from the desired pattern; and
  f) subjecting the layer to be patterned to reactive ion etching with the developed graft polymer acting as a mask to thereby form the desired pattern on the substrate.

Another aspect of the present invention relates to alkoxy metallic compounds wherein the metal is titanium, zirconium and/or hafnium and which further comprises silicon, tin and/or germanium.

A still further aspect of the present invention is concerned with graft polymers of a polymer having reactive hydrogen groups and grafted through reactive hydrogen groups an alkoxy metallic compound wherein the metal is titanium, zirconium and/or hafnium and wherein the alkoxy metallic compound further comprises silicon, tin and/or germanium.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized the invention is capable of other and different embodiments, and its several details are capable of modifications in various obvious respects, without departing from the invention. Accordingly, the description is to be regarded as illustrative in nature and not as restrictive.

BEST AND VARIOUS MODES FOR CARRYING OUT INVENTION

The graft polymers according to the present invention are obtained from a polymer having reactive hydrogen groups. The reactive hydrogen groups include hydroxy, amino, amido, carboxyl and thio groups. Examples of some suitable polymers are polymers of hydroxy alkyl acrylates, polymers of hydroxy alkyl methacrylates, Novalacs, polymers of vinyl alcohol, polymers of hydroxy styrene, polyamides, cellulosic polymers such as cotton and paper, starch, rayon and proteins.

Examples of some polymers of hydroxyalkyl acrylates and polymers of hydroxyalkyl methacrylates are disclosed in U.S. Ser. No. 08/700,348 and 08/717,644, disclosures of which are incorporated herein by reference.

These polymers contain pendant recurring groups selected from the group consisting of:

—COO—CH$_2$—CH(OH)—(CH$_2$)$_x$—H, wherein x is an integer of 0–20;

—COO—CH$_2$—CH(OH)—(CH$_2$)$_y$—HE—(CH$_2$)$_z$—H; and mixtures thereof, wherein HE is O or S, and each y and z individually is 1–18; and mixtures thereof.

Typical of such polymers are poly(2-hydroxyalkyl acrylate) and poly(2-hydroxyalkyl methacrylate) polymers.

The alkyl groups are straight or branched chain saturated hydrocarbon having from 1 to 22 carbon atoms.

Some examples of these poly(2-hydroxyalkyl acrylate) and poly(2-hydroxyalkyl methacrylate) polymers are:
Poly(2-hydroxyethyl methacrylate)
Poly(2-hydroxypropyl methacrylate)
Poly(2-hydroxyethyl acrylate)
Poly(2-hydroxypropyl acrylate)

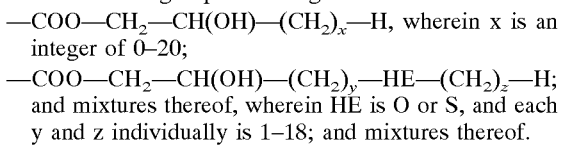

Poly(2-hydroxybutyl acrylate)
Poly(2-hydroxypentyl acrylate).

Other suitable homopolymers include those having as backbone a polyacrylate, a polymethacrylate, a polymaleate, and a polyvinyl alcohol.

In addition, copolymers employed according to the present invention are from:

1) at least one monomer selected from the group consisting of 2-hydroxyalkyl methacrylate, 2-hydroxyalkyl acrylate, and mixtures thereof wherein the alkyl has 1–10 carbon atoms; and
2) at least one monomer selected from the group consisting of alkylacrylate, alkylmethacrylate, and mixtures thereof wherein the alkyl has 1–10 carbon atoms.

The amount of 1) is about 75 to about 95, preferably about 80 to about 90, and most preferably about 84 to about 87 wt. %; and the amount of 2) is about 5 to about 25, preferably about 10 to about 20 and most preferably about 13 to about 16 wt. % These weight percents are based upon the total weight of 1) and 2).

Examples of suitable copolymers are copolymers of 2-hydroxyalkyl methacrylate and/or 2-hydroxyalkyl acrylate with alkylacrylate and/or alkylmethacrylate. As used in describing the resins which may be used in this invention, the term alkyl in the ester moiety refers to a straight or branched chain hydrocarbon having from 1 to 10 carbon atoms and containing no unsaturation. Specific copolymers include: copolymers of 2-hydroxyethyl methacrylate and methylmethacrylate; copolymers of 2-hydroxypropyl methacrylate and methylmethacrylate; copolymers of 2-hydroxyethyl methacrylate and t-butylmethacrylate; copolymers of 2-hydroxypropyl methacrylate and t-butylmethacrylate; copolymers of 2-hydroxyethyl acrylate and t-butylmethacrylate; copolymers of 2-hydroxypropyl acrylate and t-butylmethacrylate; copolymers of 2-hydroxyethyl methacrylate and methylacrylate; copolymers of 2-hydroxypropyl methacrylate and methylacrylate; copolymers of 2-hydroxyethyl acrylate and methylmethacrylate; copolymers of 2-hydroxypropyl acrylate and methylmethacrylate; copolymers of 2-hydroxyethyl acrylate and methylacrylate; copolymers of 2-hydroxypropyl acrylate and methylacrylate; copolymers of 2-hydroxypropyl acrylate and methylacrylate; copolymers of 2-hydroxybutyl methacrylate and methylmethacrylate; copolymers of 2-hydroxybutyl acrylate and methylmethacrylate; and copolymers of 2-hydroxypentyl acrylate and methylmethacrylate.

The polymers typically have weight average molecular weight of about $10^4$ to about $10^6$, more typically about 50,000 to about 650,000, an example being about 300,000. The polymers typically have Tg of up to about 70° C.

It has been found according to the present invention that alkoxy titanates, alkoxy zironates and/or alkoxy hafnates can be grafted to above polymers by equilibrium reaction through an alkoxy group and active hydrogen of the polymer. In particular, the reactive can be carried out by merely mixing the reactants, and heat and catalysts are not required.

However, in order to avoid crosslinking, the reaction is carried out in solution in a low boiling point alcohol and preferably in ethanol. Other alcohols include methanol, isopropanol and n-butanol.

The presence of the alcohol prevents crosslinking and facilitates handling of the graft polymer permitting it to be readily processed such as coated onto a substrate. However, upon removal of the alcohol such as by evaporating, the polymer will then form a cross-linked material. Accordingly, the presence of the alcohol provide a composition that can be thought of as being a latent crosslinkable composition.

Concerning the graft polymerization, the equilibrium is maintained in solution, and causes an increase in the viscosity of the polymer solution, but it does not cause precipitation of the polymer as other crosslinking methods do. However, upon removal of the solvent, crosslinking occurs resulting in a tough new resin. In lithography, it is practiced to cast films of the resist solution and bake the film at elevated temperatures where all of the solvents are driven off, precisely the conditions needed for crosslinking the polymers according to the present invention.

Typically, the amount of the alkoxy metallic compound is about 0.1 to about 15 molar % of the polymer, with about 10 molar % being an example.

The organometallic compounds have at least one alkoxy group and up to four alkoxy groups. Preferably the organometallic compound has four alkoxy groups.

Examples of some suitable organometallic compounds for use in the present invention are titanium tetramethoxide, titanium tetraethoxide, titanium tetrapropoxide, titanium tetrabutoxide, titanium tetrapentoxide, titanium tetrahexoxide, titanium tetraheptoxide, titanium tetraoctoxide, zirconium tetramethoxide, zirconium tetraethoxide, zirconium tetrapropoxide, zirconium tetrabutoxide, zirconium tetrapentoxide, zirconium tetrahexooxide, zirconium tetraheptoxide, zirconium tetraoctoxide, and hafnium ethylhexano-tert-butoxide. Mixtures of any of the compounds can be used if desired.

Furthermore, the improvement in RIE retardation can be enhanced by providing the organometallic compounds with a silicon, tin and/or germanium. This can be accomplished by reacting the organometallic compound with a silicon, tin and/or germanium compound that has an active hydrogen to react through one of the alkoxy groups of the organometallic compound and leaving other alkoxy groups intact for subsequent grafting.

A typical silicon compound is presented by the following formula:

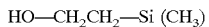

HO—CH$_2$CH$_2$—Si (CH$_3$)

Furthermore, dyes can be grafted onto polymers and especially cotton according to the present to create a permanent graft. For instance, a dye having an active hydrogen group such as an OH group is reacted through one of alkoxy groups of the organometallic compound while having other alkoxy groups intact for subsequent grafting.

Typical dyes include acid red 73 (a dye which contains a hydroxyl group) and Malachite green carbinol.

Solutions of the above grafted polymers typically include a cosolvent along with the alcohol such as dimethylformamide perfluoroisopropanol or 1-methyl-1-pyrrolidinone.

The solution can then be coated onto the desired substrate, such as by spin casting. Preferred substrates are those used in fabricating integrated circuits. Typical film thicknesses of the compositions are about 0.3 to about 1 micron and more typically about 0.5 to about 1 micron (dry). In addition, the films are typically baked after deposition at temperatures of about 90 to about 140° C. and more typically at about 100 to about 120° C. to cause crosslinking.

Irradiation of crosslinked polymers according to the present invention produce positive working photoresists. This may be due to side chains of the photoresist detaching from the main chain upon irradiation thereby breaking the crosslinking bridges.

The following illustrates one of many possible fabrication sequences for using the composition of the present invention for microlithography. In this particular sequence, a pattern of chromium metal on a quartz plate is provided by the following steps:

1. A thin film of chromium metal is provided on the surface of a quartz plate;
2. The metal layer is coated with the resist;
3. The resist is patterned;
4. The plate is developed in a suitable developer;
5. The exposed chromium film is etched either by wet etch or by dry etch;
6. The residual resist is removed.

An additional advantageous application of the present invention including rendering cotton or paper by hydrophobic by grafting an organometallic compound of the present invention having hydrophylic groups. These hydrophobic materials repel water and are extremely oil absorbent rendering them useful for controlling oil spills.

Furthermore, the present invention can be used to graft extremely polar moieties onto cotton or paper making these materials very hydrophobic. This can be achieved by providing an organometallic compound of the present invention that also includes a polar moiety such as a polyether, amide or polyol group. These hydrophobic materials could be used in diapers and other applications where bibulous materials are needed.

The following non-limiting example 1 are presented to further illustrate the present invention:

EXAMPLE 1

To a solution of about 1 g of poly(2-hydroxyethyl methacrylate) in about 15 ml NMP were added about 8 ml ethanol followed by a solution of 0.3 g of Tyzor TOT in 2 ml ethanol. The last solution was added dropwise with stirring. The solution was spin coated onto Si wafers at 2000 RPM. The wafer was baked at about 100° C. for about five minutes. The final film thickness was 0.375 microns.

The film was exposed with e-beam at various radiation intensities and developed for 2 minutes in tetraethylammonium hydroxide (TMAH) 0.265%.

To illustrate the effectiveness of the present invention, Tyzor TOT is a commercially available alkoxy titanate. Its addition to the poly(2-hydroxyethyl methacrylate) reduced the etch rate (in a chlorine/oxygen plasma environment) from 2220 Å/min for poly(2-hydroxyethyl methacrylate) to only 800 Å/min. This compares favorably with the rate of Novolak (825 Å/min), an industry standard.

The improved RIE resistance rate is evident from the data presented in Table 1.

TABLE 1

| Material | Etch Rate |
| --- | --- |
| Poly-Hema (SPAR) | 2182 (Å/min) |
| Poly-Hema/10% Ti Additive (0.86% Actual Ti) | 831 (Å/min) |
| Poly-Hema/20% Ti Additive (1.7% Actual Ti) | 614 (Å/min) |
| Poly-Hema 30% Ti Additive (2.6% Actual Ti) | 614 (Å/min) |
| Poly-Hema/40% Ti Additive (3.4% Actual Ti) | 529 (Å/min) |

The e-beam sensitivity of the above-mentioned titanate films is 12 microcoul/sq.cm. at 50 KV. This represents a very slight decrease in sensitivity compared to poly HEMA which is about 10 microcoul/sq.cm at 50 KV. The resolution obtained so far for e-beam is 0.25 microns.

EXAMPLE 2

A mixture of tetraisopropyl titanate and 2-hydroxyethyl-1-trimethyl silane with a mole ratio of 1:4, was heated under nitrogen for one hour at 100° C. and fractionated in vacuum to remove isopropanol. When no more isopropanol distilled, the product was distilled at 0.1 mm Hg. The product contained silicon at a ratio that indicated that one of the isopropanols was replaced with 2-hydroxyethyl-1-trimethyl silane. This product was used as titanate additive in place of Tyzer TOT according to example 1 above to improve RIE resistance and resist performance.

The resist graft polymized with the additive of this example has superior RIE resistance compared to resist graft polymerized with the Tyzor TOT additive according to example 1.

EXAMPLE 3

A mixture of tetraisopropyl titanate and octadecanol with a mole ratio of 1:4, was heated under nitrogen for one hour at 100° C. and fractionated in vacuum to remove isopropanol. When no more isopropanol distilled, the product was distilled at 0.1 mm Hg. The product incorporated the octadecyl chain. The product was used in place of Tyzon TOT according to example 1.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A solution of a graft polymer comprising a polymer having reactive hydrogen groups and grafted through reactive hydrogen groups an alkoxy metallic compound wherein the metal is selected from the group consisting of titanium, zirconium, hafnium and mixtures thereof, and an alcohol solvent; wherein the alkoxy metallic compound further includes at least one member selected from the group consisting of silicon, tin and germanium.

2. The solution of claim 1 wherein the alkoxy metallic compound comprises a titanium alkoxy compound.

3. The solution of claim 2 wherein the alkoxy compound is titanium tetramethoxide.

4. The solution of claim 2 wherein the alkoxy compound is titanium tetraethoxide.

5. The solution of claim 2 wherein the alkoxy compound is titanium tetrapropoxide.

6. The solution of claim 2 wherein the alkoxy compound is titanium tetrabutoxide.

7. The solution of claim 2 wherein the alkoxy compound is titanium tetrapentoxide.

8. The solution of claim 2 wherein the alkoxy compound is titanium tetrahexoxide.

9. The solution of claim 2 wherein the alkoxy compound is titanium tetraheptoxide.

10. The solution of claim 2 wherein the alkoxy compound is titanium tetraoctoxide.

11. The solution of claim 1 wherein the alkoxy metallic compound comprises a zirconium alkoxy.

12. The solution of claim 11 wherein the alkoxy compound is zirconium tetramethoxide.

13. The solution of claim 11 wherein the alkoxy compound is zirconium tetraethoxide.

14. The solution of claim 11 wherein the alkoxy compound is zirconium tetrapropoxide.

15. The solution of claim 11 wherein the alkoxy compound is zirconium tetrabutoxide.

16. The solution of claim 11 wherein the alkoxy compound is zirconium tetrapentoxide.

17. The solution of claim 11 wherein the alkoxy compound is zirconium tetrahexoxide.

18. The solution of claim 11 wherein the alkoxy compound is zirconium tetraheptoxide.

19. The solution of claim 11 wherein the alkoxy compound is zirconium tetraoctoxide.

20. The solution of claim 1 wherein the alkoxy metallic compound comprises a hafnium alkoxy compound.

21. The solution of claim 20 wherein the alkoxy compound is hafnium ethylhexano-tert-butoxide.

22. The solution of claim 1 wherein the alcohol contains 1 to 12 carbon atoms.

23. The solution of claim 1 wherein the alcohol comprises ethanol.

24. The solution of claim 1 which further contains a cosolvent.

25. The solution of claim 24 wherein the cosolvent is selected from the group consisting of dimethylformamide, perfluoroisopropanol and 1-methyl-1-pyrolidinone.

26. The solution of claim 1 wherein the amount of the alkoxy metallic compound is about 0.1 to about 15 molar % of the polymer.

27. The solution of claim 1 wherein the reactive hydrogen is selected from the group consisting of hydroxy, amino, amido, carboxyl acid and mixtures thereof.

28. The solution of claim 1 wherein the polymer is selected from the group consisting of polymers of hydroxy alkyl acrylate, polymer of hydroxy alkyl methacrylate, novalac, polymer of vinyl alcohol, polymer of hydroxy styrene, polyamide, cellulosic polymer, starch, rayon and protein.

29. The solution of claim 1 wherein the polymer is at least one polymer selected from the groups consisting of:
 a) polymer having pendant recurring groups selected from the group consisting of
  —COO—CH$_2$—CH(OH)—(CH$_2$)$_x$—H, wherein x is 0–20;
  —COO—CH$_2$—CH(OH)—(CH$_2$)$_y$—HE—(CH$_2$)$_z$—H; and mixtures thereof,
 wherein HE is O or S, and each y and z individually is 1–18;
 b) a copolymer from
  1) at least one monomer selected from the group consisting of 2-hydroxyalkyl methacrylate, 2-hydroxyalkyl acrylate, and mixtures thereof wherein the alkyl has 1–10 carbon atoms; and
  2) at least one monomer selected from the group consisting of alkylacrylate, alkylmethacrylate, and mixtures thereof wherein the alkyl has 1–10 carbon atoms, and wherein the amount of 1) is about 75 to about 95 weight % and the amount of 2) is corresponding about 5 to about 25 weight % being based upon the total weight of 1) and 2); and
 c) mixtures of the above.

30. The solution of claim 1 wherein the polymer comprises a poly(betahydroxyalkyl methacrylate).

31. The solution of claim 1 wherein the polymer comprises poly(betahydroxyethyl methacrylate).

32. The solution of claim 1 wherein the polymer comprises a copolymer selected from the group consisting of copolymer of 2-hydroxyethyl methacrylate and methylmethacrylate; copolymers of 2-hydroxypropyl methacrylate and methylmethacrylate; copolymers of 2-hydroxyethyl methacrylate and t-butylmethacrylate; copolymers of 2-hydroxypropyl methacrylate and t-butylmethacrylate; copolymers of 2-hydroxyethyl acrylate and t-butylmethacrylate; copolymers of 2-hydroxypropyl acrylate and t-butylmethacrylate; copolymers of 2-hydroxyethyl methacrylate and methacrylate; copolymers of 2-hydroxypropyl methacrylate and methylacrylate; copolymers of 2-hydroxyethyl acrylate and methylmethacrylate; copolymers of 2-hydroxypropyl acrylate and methylmethacrylate; copolymers of 2-hydroxyethyl acrylate and methylacrylate; copolymers of 2-hydroxypropyl acrylate and methylacrylate; copolymers of 2-hydroxypropyl acrylate and methylacrylate; copolymers of 2-hydroxybutyl methacrylate and methylmethacrylate; copolymers of 2-hydroxybutyl acrylate and methylmethacrylate; and copolymers of 2-hydroxypentyl acrylate and methylmethacrylate mixtures.

33. The solution of claim 1 wherein the polymer comprises a copolymer of 2-hydroxyethyl methacrylate and methylmethacrylate.

34. The solution of claim 1 wherein the polymer comprises a copolymer of 2-hydroxyethyl methacrylate and t-butyl methacrylate.

35. The solution of claim 1 wherein the alkoxy compound is zirconium tetrapentoxide.

36. The solution of claim 1 wherein the alkoxy compound is zirconium tetrahexoxide.

37. The solution of claim 1 wherein the alkoxy compound is zirconium tetraheptoxide.

38. The solution of claim 1 wherein the alkoxy compound is hafnium ethylhexano-tert-butoxide.

39. A solution of a graft polymer comprising a polymer having reactive hydrogen groups and grafted through reactive hydrogen groups an alkoxy metallic compound selected from the group consisting of zirconium tetrapentoxide; zirconium tetrahexoxide; zirconium tetraheptoxide; and hafnium ethylhexano-tert-butoxide.

40. A solution of a graft polymer comprising a polymer having reactive hydrogen groups and grafted through reactive hydrogen groups an alkoxy metallic compound wherein the metal is selected from the group consisting of titanium, zirconium, hafnium and mixtures thereof, and an alcohol solvent; wherein the polymer is cotton or paper.

41. A solution of a graft polymer comprising a polymer having reactive hydrogen groups and grafted through reactive hydrogen groups an alkoxy metallic compound wherein the metal is selected from the group consisting of titanium, zirconium, hafnium and mixtures thereof, and an alcohol solvent; wherein the alkoxy metallic compound further includes a dye moiety.

42. A graft polymer comprises a polymer having reactive hydrogen groups and grafted through reactive hydrogen groups an alkoxy metallic compound wherein the metal is selected from the group consisting of titanium, zirconium, hafnium and mixtures thereof and further comprises at least one member selected from the group consisting of silicon, tin and germanium.

* * * * *